United States Patent

Duane

[11] Patent Number: 5,950,846
[45] Date of Patent: Sep. 14, 1999

[54] STORAGE DEVICE WITH VERTICALLY AND HORIZONTALLY MOVABLE SUPPORTS

[76] Inventor: James N. Duane, 9815 N. Trails Rd., Spokane, Wash. 99204

[21] Appl. No.: 09/199,068

[22] Filed: Nov. 24, 1998

[51] Int. Cl.⁶ ........................................................ A47F 5/00
[52] U.S. Cl. .................. 211/175; 211/1.57; 211/207; 211/187; 108/108
[58] Field of Search .................... 211/1.57, 1.51, 211/189, 190, 191, 187, 207, 175; 108/108

[56] References Cited

U.S. PATENT DOCUMENTS

| | | | |
|---|---|---|---|
| 5,211,296 | 5/1993 | D'Heygere | 211/1.57 |
| 5,273,244 | 12/1993 | Ono | 211/1.57 |
| 5,423,503 | 6/1995 | Tanaka | 211/1.57 |
| 5,799,588 | 9/1998 | Engel | 108/108 |

*Primary Examiner*—Robert W. Gibson, Jr.
*Attorney, Agent, or Firm*—Keith S. Bergman

[57] ABSTRACT

A storage rack for metal structural elements provides a support frame having at least one vertical support column carrying a rack for hydraulically powered vertical motion. The rack provides plural groups of vertically spaced, horizontal supports which may be of a compound nature to allow an upper portion to move horizontally relatively to the rack. The horizontal supports may be subdivided for segregated storage of groups of different items on a single shelf and may extend in cantilevered or supported fashion on one or both sides of vertical support columns of the support frame. The vertical motion of the rack is powered by one or more hydraulic cylinders carried in the vertical support columns.

7 Claims, 7 Drawing Sheets

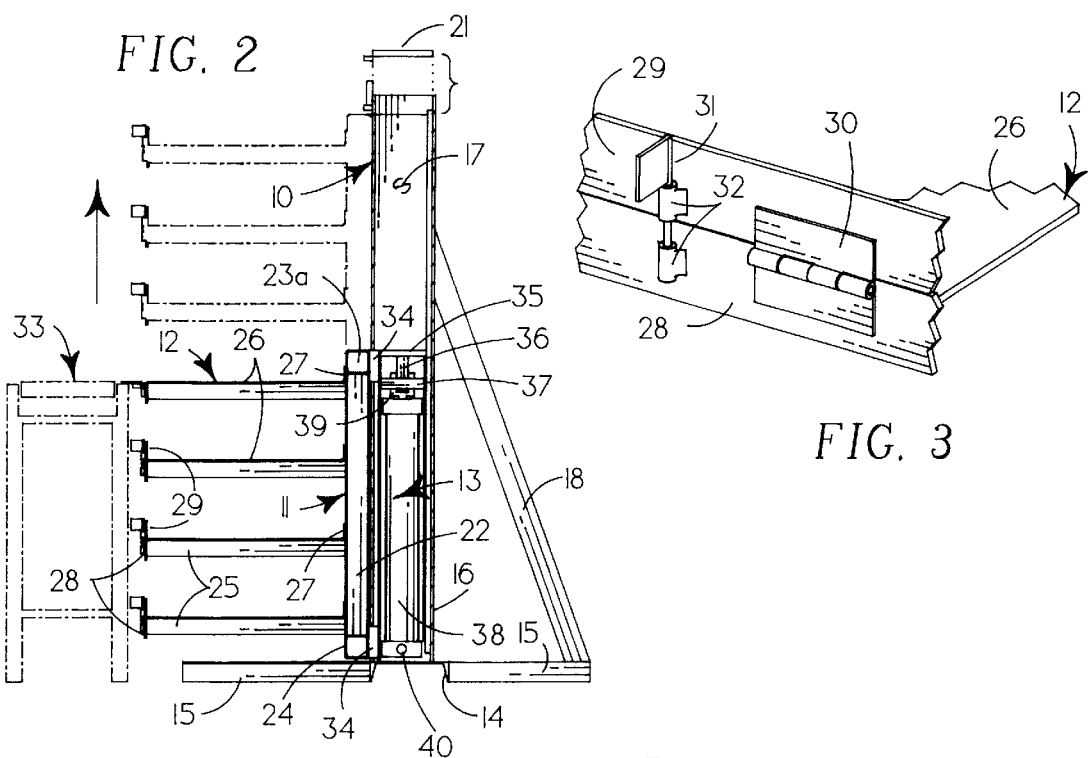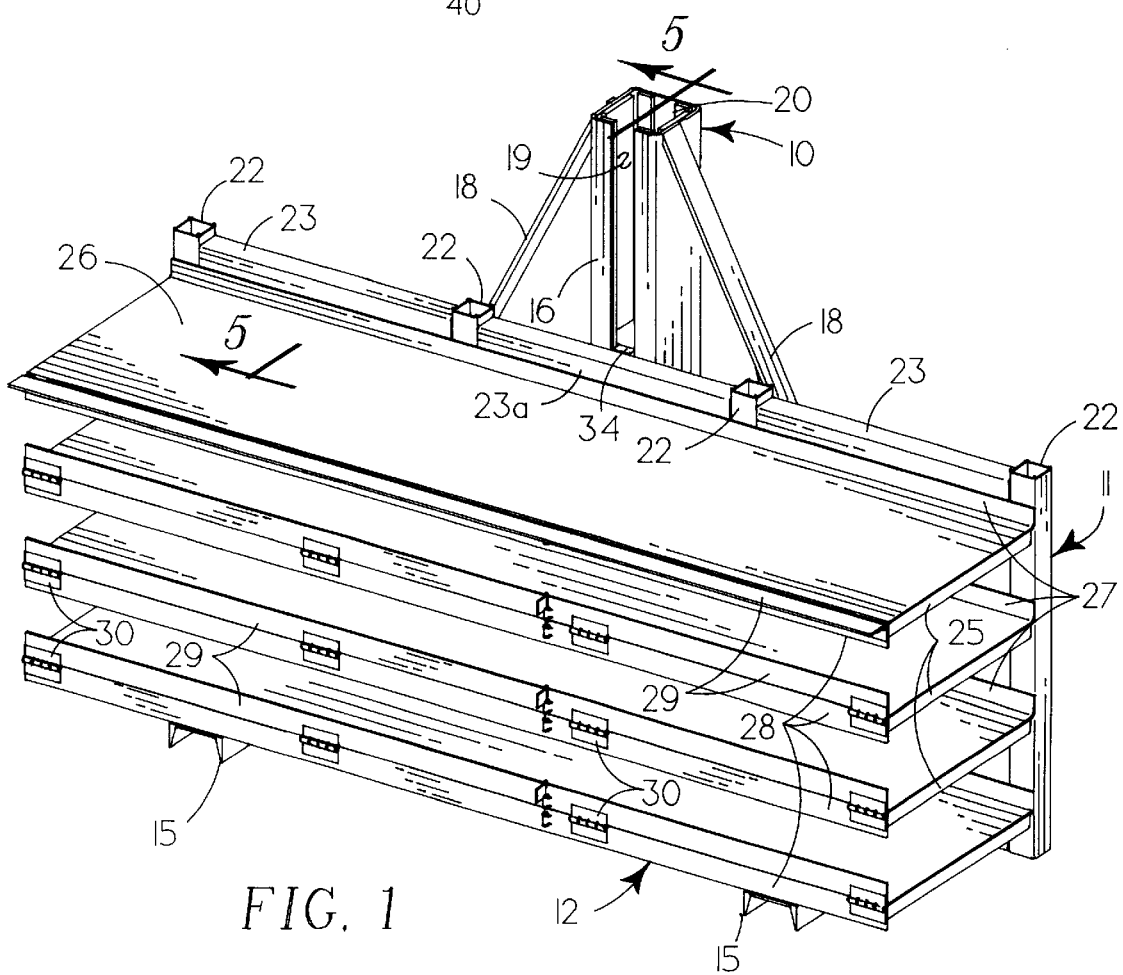

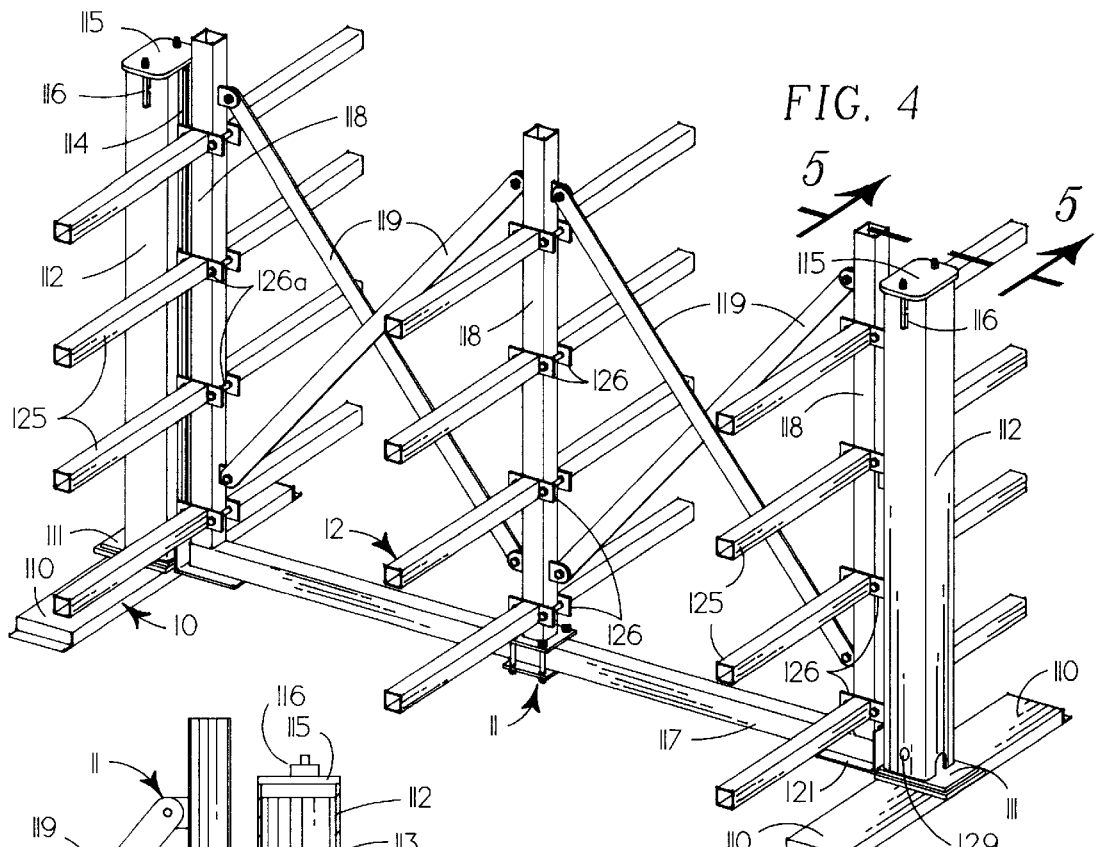
FIG. 4
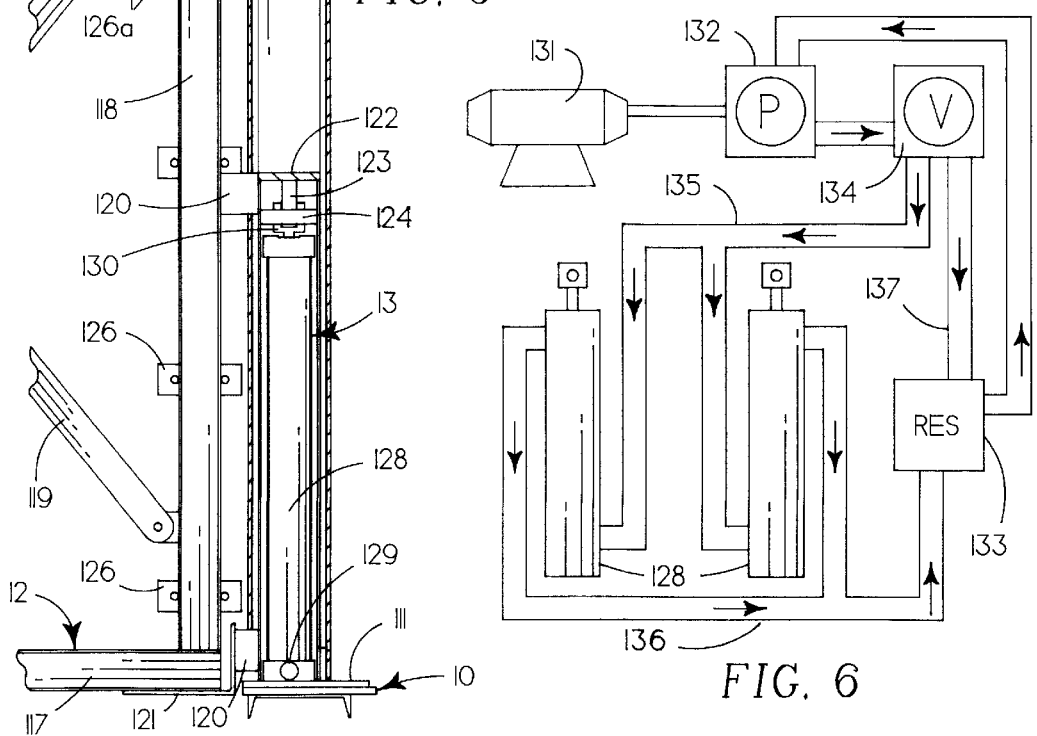
FIG. 5
FIG. 6

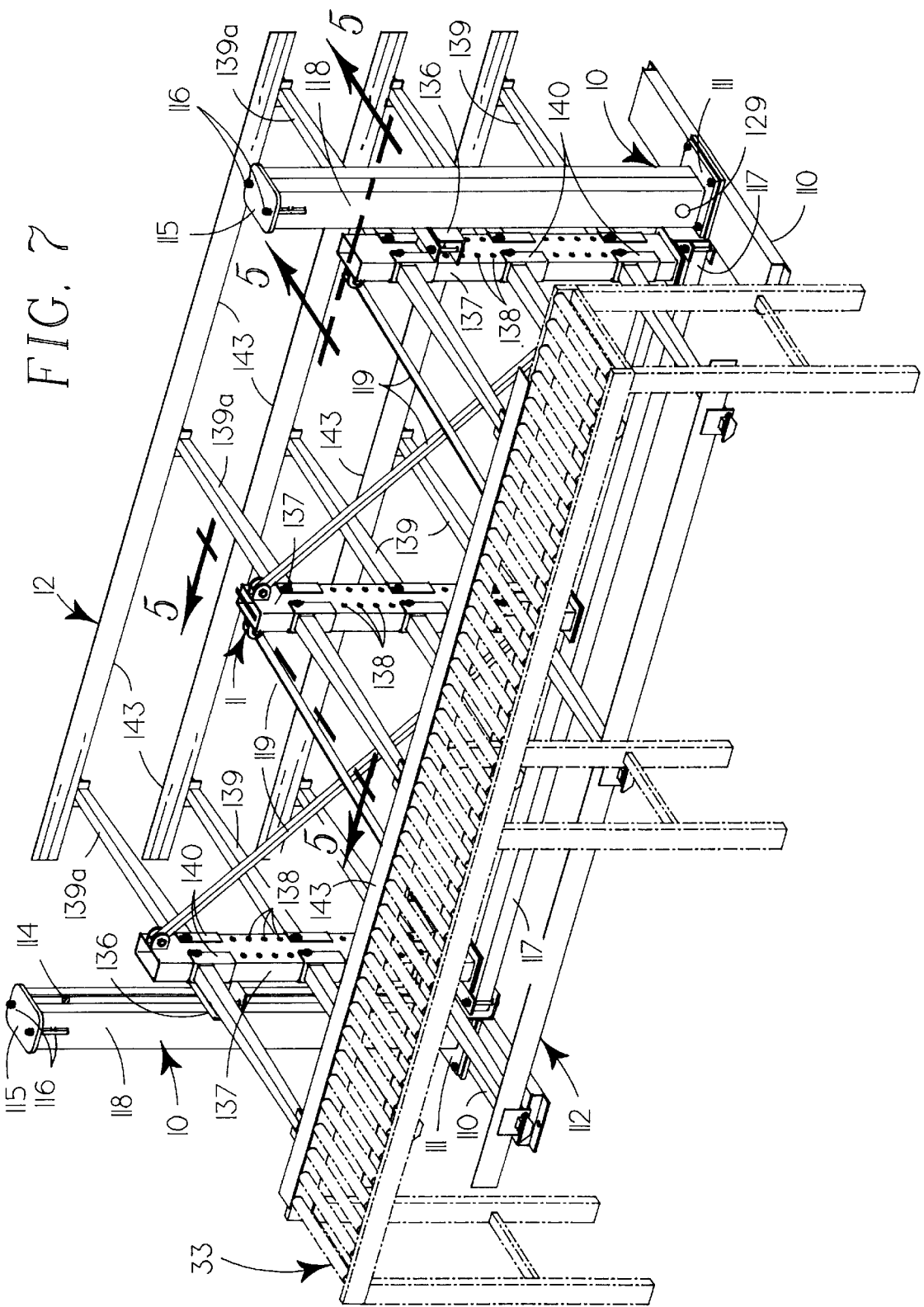

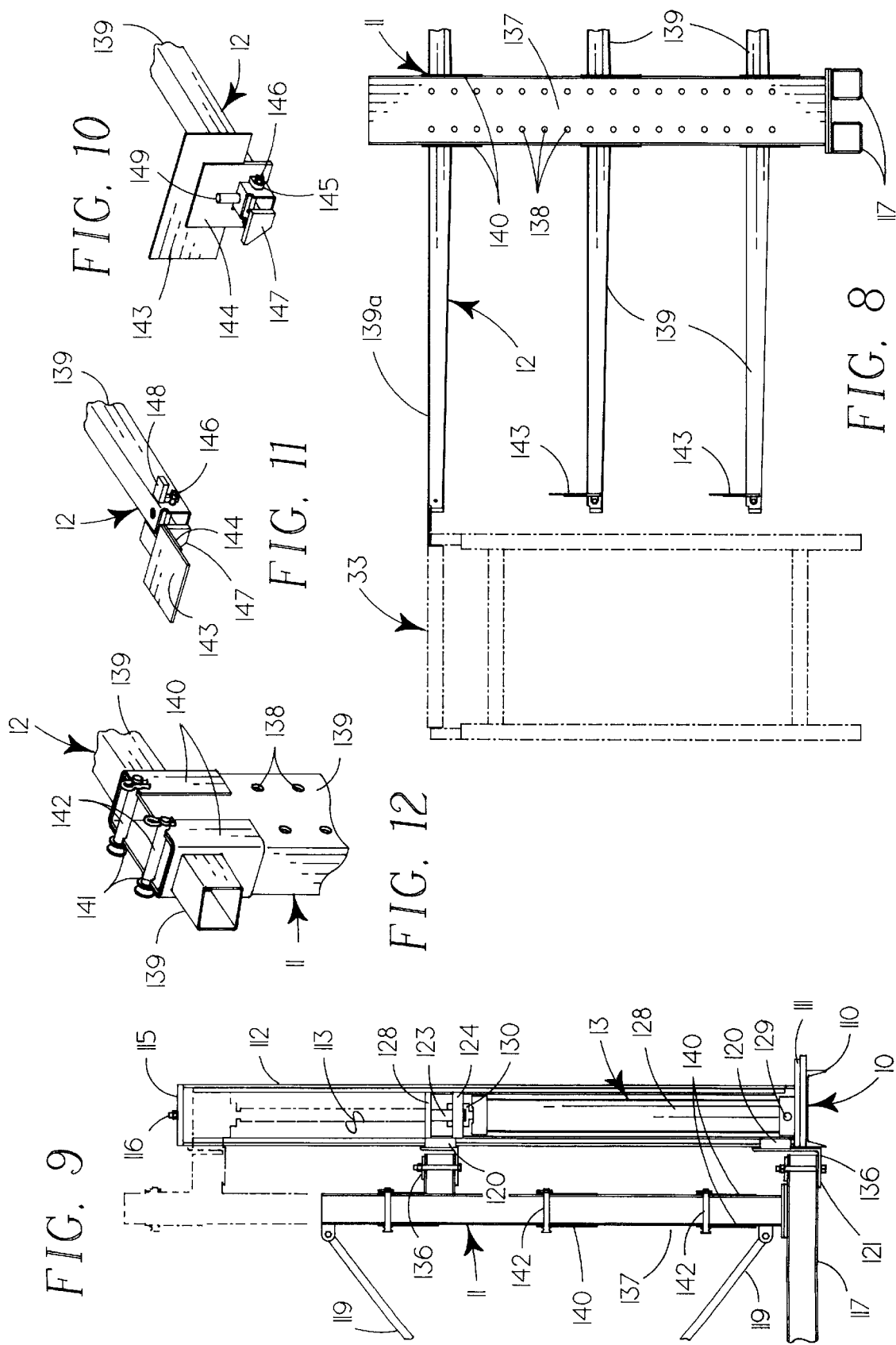

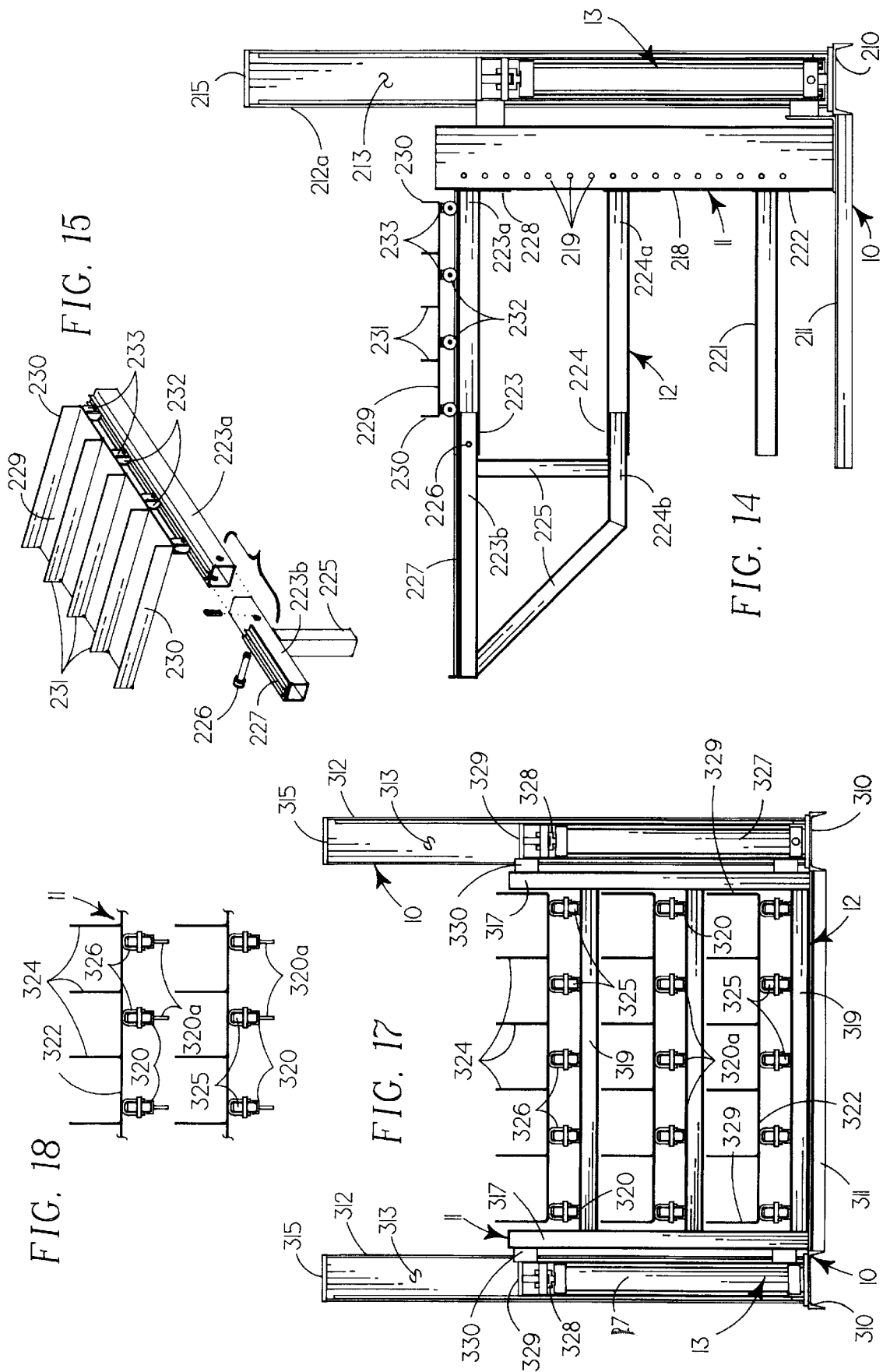

STORAGE DEVICE WITH VERTICALLY AND HORIZONTALLY MOVABLE SUPPORTS

RELATED APPLICATIONS

There are no applications related hereto heretofore filed in this or any foreign country.

FIELD OF INVENTION

This invention relates generally to a storage device having a frame carrying a rack for vertical motion with the rack carrying support elements for horizontal motion.

BACKGROUND AND DESCRIPTION OF PRIOR ART

Commonly in dealing with metal fabrication where a number of preformed structural elements of various shapes and sizes are used, such as in manufacturing plants and machine shops, groups of similar elements are required to be available for use. It has become a common practice to store such groups of similar elements on racks or shelving of various sorts usually with the groups of segregated from each other. To provide such segregation for convenience of use while minimizing the amount of floor space occupied, such racks normally have provided a plurality of vertically spaced, usually elongate horizontal supports which often have been subdivided into bins to accomplish their purposes. Though such racks have long been known and have been improved through a lengthy developmental period extending to the present time until they now are quite sophisticated, various problems still remain with their use which the instant storage device solves.

Most metal structural elements are merchandised in units of substantial length, ranging up to twenty to thirty feet, for convenience of use so that they may be cut to shorter desired lengths by ultimate users to avoid material waste. Such elements by reason of the density of the metal forming them and their configuration have substantial weight which, individually, and especially in amassed groups, makes the elements difficult to handle either manually or mechanically. This handling difficulty is only exacerbated by the simple unitary structure of many presently used storage racks that do not allow convenient access to all areas of the rack.

Machining operations with metal structural elements usually are accomplished with machines having material supporting tables that commonly are approximately the same height above a surface supporting them, such as a floor, usually between approximately thirty to forty inches. If structural elements are of a weight and configuration that allow them to be manipulated by one or relatively few workmen, it also is most convenient and safe to carry out such manual manipulation at an elevation of approximately thirty to forty inches above a surface supporting the workman to avoid undue physiological stresses and strains that may develop if the material has to be lifted from below or lowered from above such elevation.

The instant storage device deals with these problems by providing a support frame with one or more vertical columns that carry a rack structure for hydraulically powered vertical motion so that any of a plurality of vertically spaced support elements of the rack may be selectively moved to a vertical position at a desired level. The rack and other machinery may be associated in proximity so that elongate structural elements in the rack may be moved to the elevation of a machine tool work surface and the structural elements then further moved, especially in an elongate fashion, from the rack onto an adjacent machine table for machining operations. The positioning of structural elements at a proper height for manipulation without much, if any, required vertical motion substantially lessens the potential for injury to workmen not only from stress and strain, but also from accidental falling or moving of structural elements on or from a rack.

The adjustable vertical positioning of horizontally orientated support elements has an additional benefit of allowing material to be moved directly to or from the rack and adjacent transport devices such as conveyors, chutes, carts or the like without lifting motions by workmen for either loading or unloading the rack.

In dealing with metal structural elements individually or in groups, it is often necessary by reason of the weight and size of the elements to manipulate them with mechanical aid, such as by use of a forklift or overhead crane. This mechanical manipulation is sometimes prohibited and other times made difficult by reason of rack structures that have plural, vertically spaced, horizontal supports that are immovable relative to each other. Physical access for loading or unloading support elements may be prevented either from vertically above a storage rack or horizontally adjacent to it by an overlying arrangement of shelves or lack of vertical space between them. The instant rack addresses this problem by providing compound horizontal supports that have a base member upon which a support member is carried for horizontal motion, so that the support member may be moved laterally away from a vertical stack of unextended overlying support members to be freely accessed from either a horizontal or vertical direction. Such access also provides similar benefits for manual manipulation of structural elements carried on a particular horizontal support and especially allows the structural elements to be removed or replaced on the support without any, or at least minimal, vertical motion of the structural element. The better access also allows easier and more secure manual grasping of the elements while allowing a view of the entire work area to substantially lessen the possibility of accidents caused by improper handling of the structural elements or accidental motion of associated elements other than one or more being moved.

The instant support device, in providing its functions, does not negate use of the amenities known in prior storage racks. My support device provides a freestanding unitary structure that may be supported on an underlying supportative surface such as a floor and requires no attachment to structural elements such as walls or the its supporting surface. The rack allows the various horizontal supports and support configurations that have heretofore come to be used in simple unitary storage racks such as medial cantilevering of supports to allow access from both ends and both sides, providing supports that may be angled to the horizontal, providing plural vertically spaced supports that have sequentially less width in an upward direction and the like. My support device also may be supported in a hole defined below a floor or other surface supporting machinery to provide more vertically spaced supports than could be provided by a support supported at the same level as machinery.

My invention resides not in any one of these features individually, but rather in the synergistic combination of all of its structures that necessarily give rise to the functions flowing therefrom as specified and claimed.

SUMMARY OF INVENTION

My storage rack provides a support frame having at least one vertical support column carrying a rack, having plural vertically spaced horizontal supports, for vertical motion. The vertical columns carry hydraulic cylinders to power the vertical motion of the rack relative to the support frame and associated control mechanism allows adjustable vertical positioning of the rack. The horizontal supports may be of a compound nature with a base carrying a support element for lateral extension to expose material carried on the support element for vertical or horizontal access. Plural species of variants of support frames and racks are disclosed.

In creating such a support device, it is:

A principal object to provide a support frame having at least one vertical support column carrying a rack for adjustable vertical positioning relative to the support column.

A further object is to provide such a rack for such support device that has a frame supporting plural, vertically spaced, horizontally orientated support elements that may be of a compound nature with a base portion having an upper support portion extendible thereon to expose the support element for vertical and horizontal access.

A further object is to provide such a rack wherein the horizontal support elements may define a plurality of subdivisions to segregate a plurality of groups of different structural elements that each have a plurality of similar structural elements.

A still further object is to provide such a support frame wherein at least one vertical support column carries at least one hydraulic cylinder communicating with the rack for powered vertical motion of the rack relative to the support column.

A still further object is to provide such storage device that is of new and novel design, of rugged and durable nature, of simple and economic manufacture and which is otherwise well suited to the uses and purposes for which it is intended.

Other and further objects of my invention will appear from the following specification and accompanying drawings which form a part hereof. In carrying out the objects of the invention, however, it is to be understood that its essential features are susceptible of change in design and structural arrangement, with only preferred and practical embodiments of the best known modes being illustrated in the accompanying drawings and specified as is required.

BRIEF DESCRIPTION OF DRAWINGS

In the accompanying drawings which form a part hereof and wherein like numbers of reference refer to similar parts throughout:

FIG. 1 is an isometric view of a first species of support device having a single vertical support column carrying a rack having cantilevered, shelf-like horizontal supports, with an adjacent roller conveyor and band saw shown in dashed outline.

FIG. 2 is a medial, vertical cross-sectional view of FIG. 1, taken on the line 2—2 thereon in the direction indicated by the arrows.

FIG. 3 is an enlarged, isometric view of a portion of the pivotal rim on the outer edge of a horizontal support of the rack of FIG. 1 showing the details of interconnection.

FIG. 4 is an isometric view of a second species of storage device with a vertical support column at each end of a rack having cantilevered horizontal supports extending on both sides of a medial frame.

FIG. 5 is a somewhat enlarged vertical cross-sectional view through a vertical column and the adjacent portion of the vertical rack of the support of FIG. 4, taken on the line 5—5 thereon in the direction indicated by the arrows.

FIG. 6 is a diagrammatic representation in normal symbology of the hydraulic system of the storage device of FIG. 4.

FIG. 7 is an isometric view of a variant second version of storage device of the second species with a rack formed by modular components with an adjacent roller conveyor shown in dashed outline.

FIG. 8 is a vertical cross-sectional view through the second version of the second species of storage device of FIG. 7, taken on the line 8—8 thereon in the direction indicated by the arrows.

FIG. 9 is a somewhat enlarged, partial vertical cross-sectional view through a vertical column and adjacent vertical rack support of the storage device of FIG. 7, taken on the line 9—9 thereon in the direction indicated by the arrows.

FIG. 10 is an enlarged isometric view of a portion of the edge of a horizontal support element of the rack of FIG. 7 with the edge support in upright position.

FIG. 11 is a similar, enlarged isometric view of the same edge portion shown in FIG. 10, but with the edge supporting lowered horizontal position.

FIG. 12 is a somewhat enlarged, isometric view, partially cut-away, to show the details of interconnection of the modular horizontal and vertical elements of the rack of the storage device of FIG. 7.

FIG. 14 is a medial cross-sectional view through the storage device of FIG. 13, taken on the line 14—14 thereon in the direction indicated by the arrows.

FIG. 15 is a somewhat enlarged and expanded partial isometric view showing the interconnection of elements of the horizontal support.

FIG. 17 is a vertical cross-sectional view through the horizontal support at the right end portion of the storage device of FIG. 16, taken on the line 17—17 thereon in the direction indicated by the arrows.

FIG. 18 is a partial cross-sectional view between horizontal supports of the storage device of FIG. 16, taken on the line 18—18 on FIG. 16 in the direction indicated by the arrows.

DESCRIPTION OF THE PREFERRED EMBODIMENT

Figure 13:
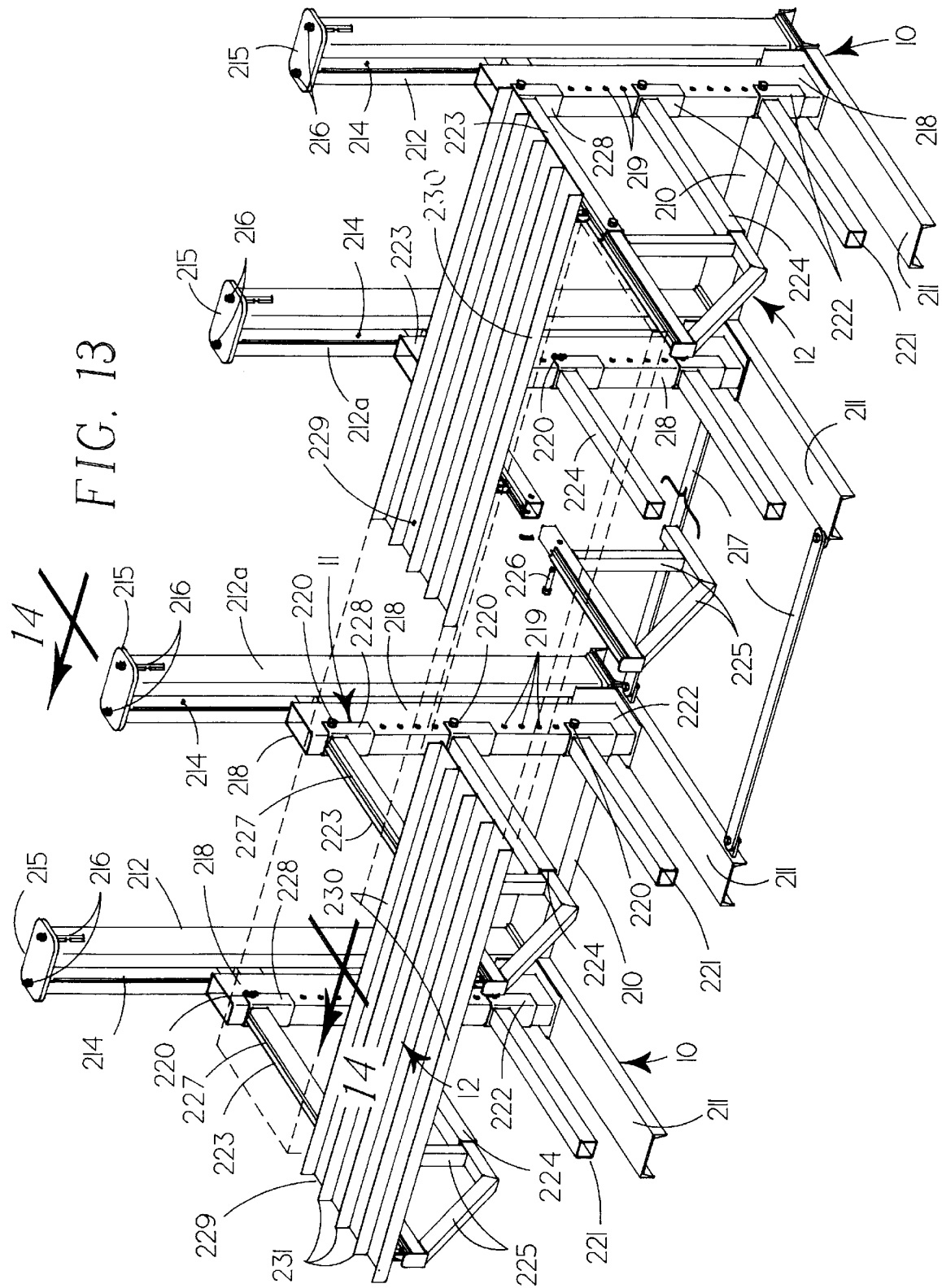
FIG. 13 is an isometric view of a third species of storage device having four laterally positioned vertical support columns carrying a rack with a compound, horizontally extensible support divided into bins.

My invention provides generally support frame 10 carrying rack 11, having horizontal support elements 12, for adjustable vertical motion powered by hydraulic system 13.

Support frame 10 in the first species of FIGS. 1–3 provides elongate base beam 14 interconnecting similar perpendicular foot beams 15 extending laterally on both sides of the base beam. The foot beams 15 have sufficient lateral extension to positionally maintain the support frame against lateral tilting motion relative to an underlying supportive surface. The elongate beam 14 and foot beams 15 preferably are formed of channel elements as illustrated and are structurally interconnected by welding.

Vertical support column 16 is structurally carried in the medial portion of elongate beam 14 to extend in perpendicular orientation vertically upwardly therefrom. The vertical support column 16 is formed of a box beam to define medial channel 17 extending therethrough. The support column 16 is supported for vertical positional maintenance by similar column supports 18 extending in angulated orientation from each end-facing side of the vertical support column downwardly and outwardly from the column to structurally communicate with the foot beam 15 on the same side of the support column. The lateral rack facing side of the support column defines axially aligned elongate slot 19 in its vertically medial portion to allow passage of alignment blocks carried by the rack 11. The inner surface of the support column side opposite slot 19 may also define channel 20 to aid alignment of the hydraulic system 13 and prevent skewing of its elements in the channel 17 during vertical motion. The top of support column 16 may be covered with cap 21 shown in FIG. 2 to prevent entry of debris into the upper orifice of the medial channel 17.

Rack 11 provides a planar frame formed by four equally spaced vertical supports 22 interconnected in their upper portions by three similar upper horizontal beams 23 and in their lower ends by lower horizontal beam 24. In the instance illustrated, this frame is formed of square box beams structurally joined at their interconnecting portions by welding.

The vertical supports 22 of the rack frame each carry plural, horizontally orientated, laterally extending support elements 12, comprising box beams 25 in the instance illustrated, with the beams arrayed in spaced coplanar sets of at least two beams. In the illustrations, the support beams are structurally supported in cantilever fashion to allow maximum use of and access to the horizontal support structures. It is possible to use angulated supports (not shown), especially extending from the under surface of the beams to the adjacent vertical elements of the rack, though this structure limits access to and availability of space for storage of material on the horizontal supports.

Each horizontal set of support beams 25 carries a support shelf 26 of "Z" shaped cross-section having upturned inner edge 27 adjacent the rack frame and downturned outer edge 28 distal from the rack frame. The support shelf 26 is structurally joined to the associated set of horizontal support beams 25 to provide additional strength and rigidity for the rack. In the instance illustrated, the outer downturned edge 28 supports outer pivotal edge 29 by means of plural spaced hinges 30 extending therebetween to allow motion of the pivotal edge from the vertically upstanding position shown by the lower shelves to at least a horizontal position as shown by the upper shelf in FIGS. 1 and 2. The pivotal edge 29 may be releasably maintained in the upstanding position shown in FIG. 3 by pin 31 extending between axially aligned pin receptacles 32 carried respectively by downturned edge 28 and pivotal edge 29. Such a pivotal edge is not necessary to the storage device, but makes its use more convenient as the pivotal edge maintains material on a support shelf and may form a ramp to allow cylindrical material to be rolled onto an adjacent transport structure such as roller conveyor 33 illustrated in dashed outline and partially cut-away view adjacent to the storage device of FIG. 1.

The medial portion of upper horizontal beam 23a and lower horizontal beam 24 of the rack frame carry linkage to interconnect the rack 11 with hydraulic powering system 13 partially carried in channel 17 of vertical support column 16. As seen in FIG. 2 the interconnecting structure provides lower alignment block 34, carried by lower horizontal support 24 to extend rearwardly of the support frame to slidably engage within slot 19 defined in vertical support column 16, to maintain alignment of the lower portion of the rack frame relative to the support column, while yet allowing vertical motion of the rack relative to the support column. The medial upper horizontal beam 23a carries similar alignment block 34 which in turn carries connector block 35 extending from the alignment block surface distal from the rack. The connector block 35 has a horizontal cross-section such as to allow it to movably fit within channel 17 of the support column 16 and has a vertical dimension sufficient to prevent skewing of the connector block within the channel 17. The connector block 35 carries depending connector arm 36 which defines a hole in its lower portion to accept connector pin 37 to allow interconnection of the connector block 35 with the yoke of an hydraulic cylinder.

Hydraulic powering system 13 in this first specie of rack provides hydraulic cylinder 38 carried in the lower portion of medial channel 17 defined in support column 16. The hydraulic cylinder 38 from its support on elongate beam 14 is of such configuration as to position a connector yoke at substantially the same elevation as the uppermost horizontal support 12 when the rack 11 is in its lowermost position to allow a maximum upward extension of the rack. The hydraulic cylinder 38 carries connector yoke 39 at the outer end of its piston rod. This yoke has cooperating holes defined in its legs to accept connector pin 37 to pivotally interconnect the yoke with connector block 35. The lower portion of the hydraulic cylinder 38 may be positionally maintained in the medial channel 17 of support column 16 by connector pin 40 extending therebetween, though such interconnection is not normally necessary unless a double acting hydraulic cylinder is used and then normally the rack has sufficient mass to provide gravity return to a null position. The powering and control devices of the hydraulic system are illustrated in FIG. 6 and hereinafter described in reference to the second species of rack.

The second species of storage device illustrated in FIGS. 4–12 provides a support frame 10 having two vertically coplanar support columns to support the opposite ends of a rack 11 extending therebetween.

Support frame 10 of this species provides two similar, spacedly related elements each having laterally extending foot beam 110 carrying support plate 111 in a medial position on its upper surface. Each support plate 111 structurally interconnects vertically upstanding support column 112 comprising a box beam defining medial channel 113 with elongate axially aligned slot 114 defined in the inner rack-facing side of the support column to allow passage alignment structure that also interconnects the hydraulic powering system 13 and the rack 11. The support columns 112 are each covered by caps 115 positionally maintained in releasable interconnection by fasteners 116 carried by the support columns.

Rack 11 of the second species of storage device provides horizontally spaced lower horizontal support beam 117 carrying three vertically upstanding, equally spaced vertical supports 118, all structurally interconnected at their adjacent portions. Pairs of angulated supports 119 extend in structural interconnection from each end support column to the medial support column in crossed relationship to provide rigidity and alignment for the rack frame.

The alignment mechanism for the rack of this second species of storage device is substantially the same as that described for the first species. Lower alignment block 120 is additionally supported by L-shaped bracket 121 communicating from beneath horizontal support beam 117 to the lower alignment block. Connector block 122 is essentially the same as connector block 35 of the first species of support. It provides substantially the same depending arm 123 and connector pin 124 to interconnect the hydraulic system 13.

Horizontal support structure 12 of the second species of rack provides horizontally oriented support beams 125 arrayed in vertically spaced, horizontally coplanar groups of three beams that extend laterally on both sides of the vertical supports 118. Each support beam 125 structurally carries similar fastening bracket 126 in its inner end portion that projects beyond the associated support beam to allow two such brackets to be fastened to each other in spaced horizontal adjacency on a support column 118 by nut-bolt fasteners 126a extending between the brackets on both sides of the vertical support column to provide a releasable and adjustable attachment of the support beams to the vertical support. The horizontal support beams 125 may be angulated in an upward outwardly extending orientation (not shown) as heretofore known to cause material supported thereon to tend toward an inward position by reason of gravity.

Hydraulic powering system 13 of the second species is substantially the same as the hydraulic powering system of the first species except for the number of hydraulic cylinders. The system in the second species provides vertically oriented hydraulic cylinders 128 carried in the lower portion of medial channels 113 of each support column 112 where they are maintained by pins 129 extending between the surrounding support column and the lower portion of the hydraulic cylinder. The piston rod of the cylinder 128 carries yoke 130 which is pivotally interconnected with depending connector arm 123 of connector block 122 by connector pin 124 extending therebetween.

The operation of the hydraulic powering system 13 is illustrated in diagrammatic symbology in FIG. 6. Electrically powered motor 131 mechanically drives hydraulic pump 132 which receives hydraulic fluid from reservoir 133, pressurizes the fluid and delivers it to control valving structure 134. One or more hydraulic cylinders 128 are connected to the common plenum 135 in hydraulically parallel relationship as illustrated. The control valving structure 134 delivers pressurized fluid through common plenum 135 to hydraulic cylinders 128. The hydraulic cylinders communicate through common return conduit 136 to reservoir 133 to complete the hydraulic circuit. The control valving structure 134 communicates electrically with motor 131 to control operation of pump 132 and excess pressurized fluid is recycled through the valving mechanism and return conduit 137 to the pump 132.

A second variant of the second species of storage device is shown in FIGS. 7–12 where it is seen to provide essentially the same structure of support frame 10 as the second species illustrated in FIGS. 4 and 5. A variant rack, however, provides a somewhat heavier modular construction with two horizontally adjacent lower support beams 117. To compensate for the additional horizontal thickness of the rack frame, an additional connecting bracket 136 is carried between the vertical support 118 of the rack frame and the alignment blocks 120. Vertical supports 137 of the rack of this variant species are box beams of rectilinear cross-section having their greatest dimension extending laterally and each support 137 defines a plurality of pairs of horizontally related, vertically spaced holes 138 defined in an elongate direction through the vertical support columns 137 to fasten horizontal support elements 12 thereon. This particular type of vertical support column 137 is part of a known and commercially available modular storage rack system and is not novel, per se, though convenient for use with my vertically movable storage device.

The horizontal support elements 12 of this second variant second species provide elongate horizontal support beams 139 of a tapered box beam configuration having their smallest cross-section at their laterally outermost end portion. The inner end portion of each horizontal support beam 139 carries fastening bracket 140 having a U-shaped cross-section that fits adjacent the lateral edge of a vertical support 137 and extends inwardly over and adjacent to each lateral surface of the support column. The fastening bracket 140 in its upper inner portion defines axially aligned holes 141 in its opposed legs to receive elongate fasteners 142 to fasten the bracket and its associated horizontal support in a horizontal pair of holes 138 defined in a vertical support columns 137, as shown in FIG. 12.

The outer lateral end portions of each horizontal group of vertical support beams 139 of this variant second species pivotally carry elongate edge bands 143 which may be pivoted from the vertical position shown with the two lower beams in FIGS. 7, 8 and 10 to a horizontal position shown with the uppermost support beams in FIGS. 7, 8 and 11. The pivotal mounting of the edge band 143 is shown especially in FIGS. 10–11 where it is seen that the outer end portion of each horizontal support beam 139 carries fastening plate 144 having ears 145 which are pivotally carried on pin 146 extending through the horizontal support beam in an elongate direction. The pivotally downward motion of the fastening plate 143 is restrained by stop 147 structurally carried by the end portion of the support beam 139. The vertical position of the edge band 143 is limited by stop 148 supported on the support beam 139 inwardly of the edge band and that vertical position may be maintained by pin 149 extending through the end portion of the support beam laterally outwardly of the support plate 143.

The hydraulic system 13 of this second variant species is the same as that illustrated in FIG. 6 for the second species.

A third species of storage device is illustrated in FIGS. 13–15 provides compound horizontal support 12 having an upper support shelf that may be moved laterally to allow adjustable horizontal positioning for better horizontal or vertical access to the shelf.

Support frame 10 of the third species of storage device provides two similar end members, each comprising two vertical support columns, each end member being interconnected with the other in its adjacent medial portion. Each end member provides elongate lower support beam 210 structurally communicating between two spaced, laterally extending foot beams 211, in this instance on only one side of the elongate support beams 210 at each end. Vertical support columns 212 are structurally supported on each end portion of the elongate beams 210 to extend vertically upwardly therefrom. The support columns 212 are the same as those of the first species with medial channel 213, rack facing slots 214 and caps 215 positionally maintained by fasteners 216.

The two end members of the support frame are positioned with their support columns in planar alignment and with the inner adjacent support columns 212a spacedly distant, generally approximately the same distance as the two vertical support columns of an end member are from each other. The end members are fastened in this relationship by connecting supports 217 structurally extending between adjacent surfaces of the adjacent foot beams 211 supporting the inner columns.

The rack 11 of this third species of support device provides vertical supports 218 comprising box beams of rectilinear configuration with the longer dimension extending in a lateral direction as in the variant of the second species of storage device. There are no horizontal structural interconnections between vertical supports 218 of this third species above the support beams 210, but horizontal connecting elements may be used as in the second species if required. The vertical supports 218 define vertically spaced pairs of cooperating holes 219 to carry fasteners 220 extending therethrough to interconnect support brackets of horizontal support beams.

A horizontally planar group of spaced lower support beams 221 are carried by the lower portions of the vertical support elements 218. Each lower support beam 221 carries U-shaped bracket 222 its inner end portion to receive a fastener 220 therethrough to releasably fasten the support beams 221 on the vertical supports 218 in an adjustable fashion, as in the second species of rack.

Upper compound horizontal support beams each provide upper cord 223 and lower cord 224 interconnected by vertical elements 225 in their outer end portions to form a beam-like structure. As seen in FIG. 14 the upper cord 223 is formed by telescopically related inner box channel beam 223a slidably carrying outer box channel beam 223b. The two beams are positionally maintained relative to each other by fasteners 226 extending therebetween through holes defined in the elements in their areas of adjacency. The lower cord 224 is similarly formed with inner box beam 224a and outer box beam 224b. The upper surface of the upper cord members carries wheel track 227 defining a channel formed by two spaced upstanding side rims to guide wheels carried therein in a course parallel to the axis of the upper beam.

The inner ends of both inner upper beam 223a and inner lower beam 224a carry similar U-shaped fastening brackets 228 to fasten the inner end portion of the upper and lower cords of horizontal support members in spaced adjacency on the vertical support elements 218 so that the track elements 227 will be in a parallel horizontal planar array to carry a support shelf. The upper horizontal supports of this third species are formed with a beam-like configuration to provide sufficient strength and rigidity to carry a support shelf that may be extended laterally outwardly on the horizontal supports while carrying a substantial load.

Support shelf 229 in this third species of storage device comprises a flat planar element of rectilinear configuration having upturned edges 230 at each longer side. The medial portion of the support shelf between upturned edges 230 structurally carries plural spaced upstanding dividers 231 extending parallel to the upturned edges, in the instance illustrated three in number, to divide the upper surface of the support shelf into a plurality of bins in which various groups of similar structural elements may be segregated.

The length of the support shelf 229 normally is greater than the width which is approximately one-half of the lateral length of the horizontal supports supporting the shelf. In the illustration of FIG. 13, the support shelf has been divided in a medial area and the right hand portion is shown in its inward position, with the removed portion not there illustrated shown in dashed outline, and in the left hand portion of that Figure is shown in laterally outwardmost position, again with the removed portions shown in dashed outline.

To accomplish motion between these positions, the support shelf on its undersurface carries a plurality of depending wheels 232 journaled in the legs of depending U-shaped support brackets 233 the backs of which are structurally interconnected to the undersurface of the support shelf. The support brackets and associated wheels are spacedly arrayed on the undersurface of the support shelf in lineal, spaced groups of at least two spaced wheels extending perpendicularly to the side edges of the support shelf with each group arrayed so that all wheels of the group are carried in the channel defined by a track element 227 and each group of wheels is carried in one of the track elements, as illustrated. With this structure the support shelves may be rollably moved on their associated horizontal support beam 223 from an inward position shown in the right portion of FIG. 13 to a lateral outward position shown in the left portion of that Figure. Such lateral motion allows access to the support shelves for loading and unloading, and especially allows access from vertically above such as by an overhead crane if other support shelves are positioned vertically above the one being accessed.

Though only two vertically spaced support shelves are shown in FIG. 13, it should be noted that the number of shelves is not essential to the third species of support device and there may be more or less horizontal supports of various types in varying vertically spaced relationships within the spirit and scope of my invention.

It should further be noted that with the third species of support device, if horizontal supports be formed as illustrated with the outer portion 223b of the upper cord and outer portion 224b of the lower cord interconnected by the vertical elements 225, the whole outer structure may be removed as a unit as shown in the expanded portion of FIGS. 13 and 15, and the inner elements of both horizontal supports then could be used to support material. With this configuration, however, a support shelf carried on the inner portions 223a of the upper cord obviously cannot be moved laterally outwardly any substantial distance, if at all.

Figure 16:
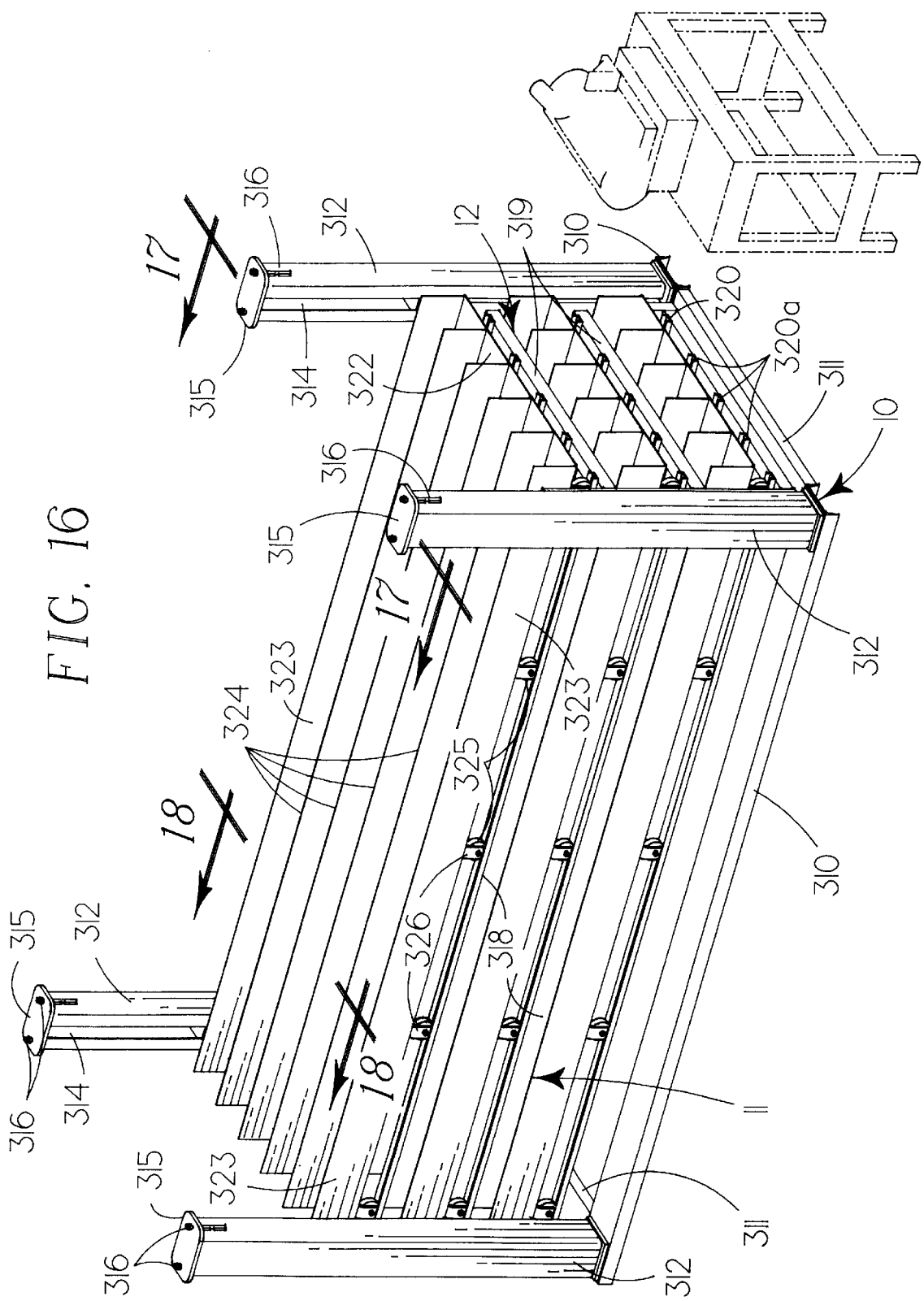
FIG. 16 is an isometric view of a fourth species of storage device having four vertical support columns arrayed near corners of a rectilinear rack having multiple horizontal supports carrying shelves extendible perpendicularly to the supports for loading and unloading.

A fourth species of storage device is illustrated in FIGS. 16–18 where it is seen to provide rectilinear support frame 10 formed by similar spaced parallel side beams 310 structurally interconnected in their end portions by similar spaced parallel end beams 311. The end portion of each side beam 310 carries a support plate which in turn structurally supports vertical support column 312 defining medial channel 313 and elongate slot 314 to allow passage of alignment blocks to the channel 313. Each support column 312 carries cap 315 positionally maintained by fasteners 316 extending between the upper portion of the column and the cap. The opposed support columns 3121 at each end of the support frame are arrayed with their elongate slots facing inwardly toward each other so that an elongate rectilinear rack may be supported between the support columns at its four corners.

Rack 11 provides four vertical elements 317 that form the corners of a rectilinear rack structure that is configured so that each vertical element 317 is immediately inwardly adjacent the inwardly facing surface of one support column 312. The vertical elements 317 are interconnected at each end of the rack by plural pairs of parallel vertically spaced horizontal end supports comprising box beams 319 that have upper surfaces coplanar in a horizontal plane. Elongate side supports comprising parallel pairs of box beams 318, that have upper surfaces coplanar in the plane of the upper surfaces of the end supports, structurally communicate between each horizontal pair of end supports spacedly inwardly of the outwardly adjacent vertical elements 317. The adjacent portions of the side and end supports are structurally joined preferably by welding to form a network of horizontal support elements 12.

The upper surface of each side support beam 318 of the rack carries elongate track element 320 extending parallel to the side supports and defining a medial channel to accept and align a support wheel of a support shelf. Similar medial track elements 320a may be carried in parallel spaced relationship between the side support beams 318 when necessary for alignment or support of shelf elements and these medial track elements may be supported by underlying beams 320a structurally interconnected between the horizontal end supports 319.

Support shelves 322 are formed similarly to the support shelves of the third species of storage device with a flat, planar element having a lateral dimension similar to, but not greater than, horizontal support beams 319, and vertically upturned elongate edge portions 323. The medial portions of support shelves 322 structurally carry plural upstanding medial upstanding dividers 324, in the instance illustrates four in number, that are arrayed in spaced relationship parallel to upturned edge portions 323.

The lower surface of each support shelf carries a plurality of depending guide wheels 325 journaled in U-shaped support brackets 326 structurally carried on the undersurface of the support shelves 322. The brackets 326 are arrayed in linear groups of at least two brackets that are spaced such that one group is positioned over the channel defined in each track element 320 to allow rolling motion of support shelf in an elongate direction for access, especially as for loading the shelf.

For use of this fourth species of storage device, an elongate table (not shown) preferably is positioned at one end of the storage device to receive a support shelf that may be rolled thereon during its extension to provide support for the shelf rather than extending it in cantilevered fashion which may make the shelf mechanically unstable for any substantial shelf extension.

The hydraulic powering system 13 of this fourth species of storage device is substantially the same as that of the other species, with hydraulic cylinder 327 carried in medial channel 313 of each support column 312, with its piston rod yoke 328 interconnected with the associated connector block 329. The connector block 329 in turn is structurally carried by upper alignment blocks 330 and the alignment blocks are structurally carried by vertical elements 317 of the rack to provide vertical motion of the rack responsive to motion of hydraulic cylinders 327.

The hydraulic control system of this species is similar to that described for the second species, except that the four hydraulic cylinders 327 of this species are in hydraulic parallel type interconnection rather than the two cylinders of the second species.

This fourth species of storage device is particularly adapted for use with elongate material of various types that may be removed in an elongate direction from one end of the support structure and manually moved, preferably by pulling while the material is still partially supported by the support structure, to a work table of an adjacent metal working tool.

The use of my storage device in any of its species is substantially similar. In the first and second species, for loading or unloading of material, the control valving structure 134 is operated to responsively move the piston of hydraulic cylinder 128 which moves rack 11 to a desired vertical position for the loading or unloading of product carried or to be carried by the rack. After the loading or unloading operation is accomplished, the rack may be left in the existing state or returned to its downwardmost null position by further operation of the control valving structure.

In the third and fourth species of storage device that have shelving elements movable relative to horizontal supports 12, the rack is vertically positioned for use in the same fashion as for the first and second species. The movable shelf structure then is moved horizontally on the horizontal supports as desired for loading or unloading, in the case of the third species laterally outwardly or in the case of the fourth species outwardly in an elongate direction. After the loading or unloading operation, the shelf again may be returned to its inward position and the rack to its lowermost null position.

The foregoing description of my invention is necessarily of a detailed nature so that a specific embodiment of it might be set forth as required, but it is to be understood that various modifications of detail, rearrangement and multiplications of parts might be resorted to without departing from its spirit, essence or scope.

Having thusly described my invention, what I desire to protect by Letters Patent, and

What I claim is:

1. A storage device having a vertically movable storage rack with support elements, comprising in combination:

a support frame having means for support on an underlying supportative surface and carrying at least one vertical support column defining an internal channel and having at least one elongate slot defined therein to communicate with the channel;

a rack having a frame with at least one alignment block extending through the slot defined in the vertical support column;

at least two spaced coplanar horizontal support elements carried by the rack to support material on the rack; and hydraulic powering means including at least one hydraulic cylinder, carried in the channel of the at least one vertical support column, with an upwardly extensible piston rod communicating with the at least one alignment block of the rack and control means for regulating the vertical position of the piston rod to responsively determine the vertical position of the rack relative to the support frame.

2. The storage device of claim 1 further characterized by:

the rack frame having vertically spaced pairs of alignment blocks, each pair of alignment blocks arrayed to communicate through the slot defined in one vertical support column, and the rack carrying a plurality of horizontal supports arrayed in horizontally spaced groups of at least two horizontally spaced horizontal supports with the groups vertically spaced relative to other vertically related groups.

3. The storage device of claim 1 wherein the at least two horizontal support elements carry a movably supported support shelf for motion toward and away from the rack.

4. The storage device of claim 1 further characterized by:

the support frame having two spaced vertical support columns with the elongate slots defined in the support columns facing each other;

the rack frame being elongate with opposed sides and ends defined by vertical supports at each end carried between the adjacent surfaces of the support columns, each vertical support having at least one alignment block communicating through the slot defined by the adjacent support column;

the rack carrying a plurality of vertically spaced groups of at least two horizontal support elements extending outwardly on the opposed sides of the rack frame; and the hydraulic system having an hydraulic cylinder carried in each support column with the piston rod of each cylinder communicating with the adjacent alignment block.

5. The storage device of claim 1 further characterized by:

the support frame having one vertical support column;

the rack having a planar peripherally defined frame carrying vertically spaced alignment blocks in a medial position on one side for communication through the slot defined in the vertical support column; and plural vertically spaced group of at least two spaced horizontal supports supporting shelves carried by the rack to extend outwardly from the rack side distal from the support column.

6. The storage device of claim 1 further characterized by the support frame having at least two vertical support columns in linear array, with the slots defined therein facing in the same directions and a rack carried on the slot facing side of the support columns with the horizontal supports extending away from the support columns.

7. The storage device of claim 1 further characterized by the support frame having four vertical support columns in rectilinear array with the slots defined by the support columns facing a common medial plane;

the rack comprising a peripherally defined rectangular parallelepiped having horizontally spaced pairs of vertically spaced alignment blocks arrayed to be carried in the slots defined in the vertical support columns; and the rack carrying plural horizontal support elements, arrayed in horizontally spaced groups of at least two horizontal support elements with the groups vertically spaced relative to each other, and each group of horizontal support elements carrying at least two spaced, parallel tracks supporting a support shelf having at least two spaced depending wheels engaged in each track for motion parallel to said tracks.

* * * * *